United States Patent [19]

Tsuchiya et al.

[11] Patent Number: 5,267,042
[45] Date of Patent: Nov. 30, 1993

[54] IMAGE PICKUP DEVICE FOR AUTOMATICALLY RECORDING THE LOCATION WHERE AN IMAGE IS RECORDED

[75] Inventors: Toshiaki Tsuchiya, Kawagoe; Ichiro Hatano, Meguro, both of Japan

[73] Assignee: Pioneer Electronic Corporation, Tokyo, Japan

[21] Appl. No.: 727,173

[22] Filed: Jul. 9, 1991

[30] Foreign Application Priority Data

Jan. 11, 1991 [JP] Japan .................... 3-002352

[51] Int. Cl.⁵ .................. H04N 5/30; H04N 5/225; H04N 7/18
[52] U.S. Cl. .................. 358/209; 358/909; 358/109
[58] Field of Search .......... 358/909, 103, 108, 109, 358/209; 354/105, 109, 75, 76

[56] References Cited

U.S. PATENT DOCUMENTS

| | | | |
|---|---|---|---|
| 4,792,904 | 12/1988 | Reinagel et al. | 358/103 |
| 4,792,907 | 12/1988 | Ikeda et al. | 364/449 |
| 4,814,711 | 3/1989 | Olsen et al. | 358/109 |
| 4,930,014 | 5/1990 | Maeda et al. | 358/209 |
| 4,972,254 | 11/1990 | Endo et al. | 358/44 |
| 5,036,344 | 7/1991 | Inoue et al. | 354/106 |
| 5,040,068 | 8/1991 | Parulski et al. | 358/209 |
| 5,045,937 | 9/1991 | Myrick | 358/109 |
| 5,072,396 | 12/1991 | Fitzpatrick et al. | 358/103 |
| 5,155,774 | 10/1992 | Numagami | 358/103 |

Primary Examiner—Michael T. Razavi
Assistant Examiner—Wendy R. Greening
Attorney, Agent, or Firm—Sughrue, Mion, Zinn, Macpeak & Seas

[57] ABSTRACT

In recording an object image by the image pickup device body, the position detection means detects the present location of the image pickup device body to record the resulting position data at the same time when the object image is recorded onto the image recording medium by the recording means.

5 Claims, 4 Drawing Sheets

IMAGE PICKUP DEVICE FOR AUTOMATICALLY RECORDING THE LOCATION WHERE AN IMAGE IS RECORDED

BACKGROUND OF THE INVENTION

This invention relates to an image pickup device such as a still camera or a video camera, etc., and more particularly to an image pickup device capable of automatically recording a place where an image is picked up.

Generally, at the time of photographing by a still camera, or image recording by a video camera, there are instances where a user desires to record a place where that image is picked up (hereinafter simply referred to as an image pickup place according to the circumstances). In such a case, hitherto, a person who takes a picture records respective image pickup places every time an image is recorded by means such as making a memorandom.

However, in the case of photographing via still camera, there are instances where images photographed at different places are mixed even if the same photosensitive film is used. In the event that the user forgets to make a memorandom, there are instances where an image pickup place cannot be identified. This is also the case with image recording using a video camera. Particularly, in the scientific field, there is a possibility that loss of recorded data may have a serious, detrimental impact on the results of study.

An object of this invention is to provide an image pickup device capable of automatically recording the location where an image is recorded at the same time of photographing.

SUMMARY OF THE INVENTION

To solve the above mentioned problems, an image pickup device according to this invention comprises an image pickup device body for recording an object image onto an image recording medium, position detection means for detecting a present location of the image pickup device body at the same time when the object image is recorded, and recording means for recording data indicative of the present location obtained by the position detection means onto the image recording medium.

In accordance with this invention, in picking up an object image by the image pickup device body, the position detection means detects a presence position of the image pickup device body to record that position data at the same time when the object image is recorded onto the image recording medium by the recording means. As a result, the position data is indicated or recorded along with the image on the image recording medium.

As stated above, in accordance with this invention, since position data from the position detection means is automatically recorded onto the image recording medium at the time of photographing by the image pickup device body, the labor required to make memoranda at every location where an image is recorded becomes unnecessary.

DESCRIPTION OF THE PREFERRED EMBODIMENTS

Preferred embodiments of an image pickup device according to this invention will now be described with reference to the attached drawings.

Prior to description of respective embodiments, the principle of this invention will be described with reference to FIG. 1 to aid the understanding of this invention.

Figure 1:
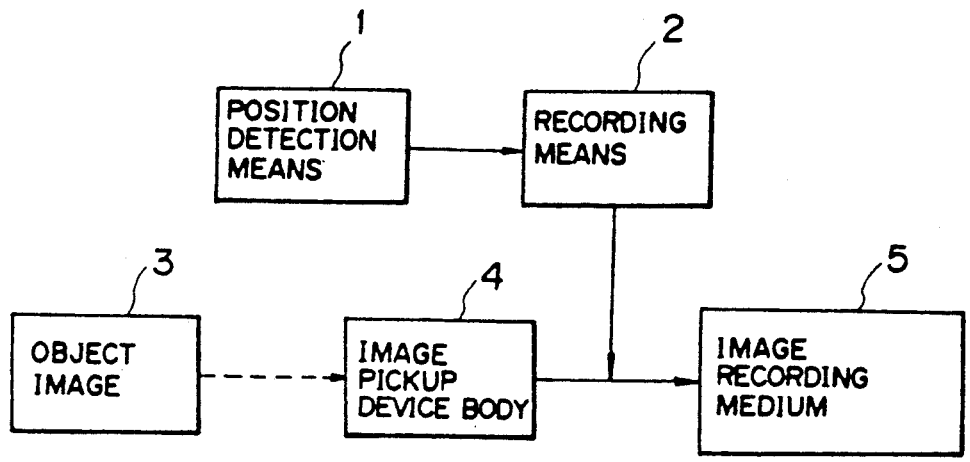
FIG. 1 is an explanatory view of the principle of this invention.

An image pickup device according to this invention comprises, as shown in FIG. 1, an image pickup device body 4 for recording an object image 3 onto an image recording medium 5, position detetion means 1 for detecting a present location of the image pickup device body 4 at the time of photographing the object image 3, and recording means 2 for recording data indicative of the present location obtained by the position detection means 1 onto the image recording medium 5. In recording an object image 3 by the image pickup device body 4, the position detection means 1 detects the presence position of the image pickup device body 4 for recording the position data at the same time the object image 3 is recorded onto the image recording medium 5 by the recording means 2.

Figure 2:
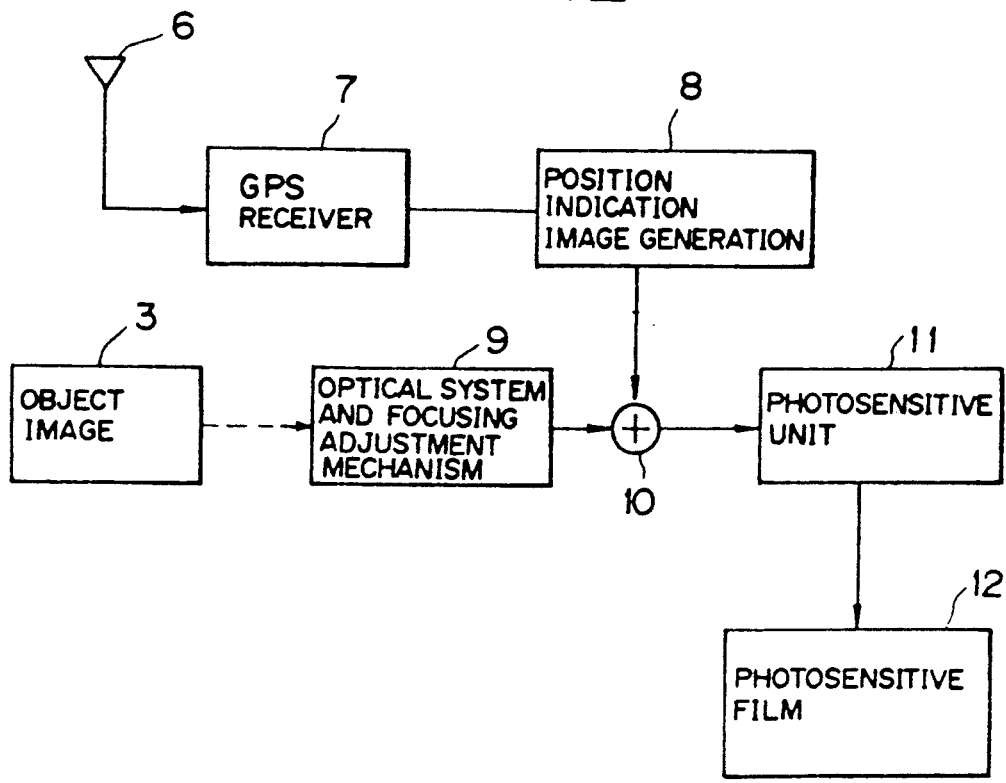
FIG. 2 is a block diagram of a first embodiment according to this invention.

A first embodiment of the invention is shown in FIG. 2. In the first embodiment, a still camera is used as the image pickup device 4.

As shown in FIG. 2, the image pickup device generally comprises a Global Positioning System (GPS) 6, a GPS receiver 7, and a position indication image generation unit 8 which serve as the position detection means 1, an optical system and focusing adjustment mechanism 9, and a photosensitive unit 11 which serve as the image pickup body 4, a coupler 10 and a photosensitive unit 11 which serve as the recording means 2, and a photosensitive film 12 as the image recording medium 5.

The GPS receiver 7 may use, e.g., a single frequency type independent positioning receiver of the L1 band utilizing only C/A (Clear and Acquisition or Coarse and Access) code. Namely, the GPS receiver 7 receives, by the GPS antenna 6, a radio wave including a navigation message from three to four artificial satellites to provide an intermediate frequency signal by the frequency conversion to process this signal by C/A code generated in the GPS receiver 7 to decode a navigation message to carry out a positioning calculation on the basis of the navigation message. The position indication image generation unit 8 receives position data A from the GPS receiver 7 to generate character figures (digits, etc.) of the position data A to output, as an optical signal, the present position data A (latitude, longitude) to the coupler 10.

The optical system and focusing adjustment mechanism 9 is arranged so as to surround the object image 3. Thus, this arrangement 9 makes an adjustment such that a light of the object image 3 is in correspondence with an in-focus position to guide the light to the photosensitive unit 11 via the coupler 10.

The photosensitive unit 11 allows an incident light to be exposed onto the photosensitive film 12. At this time, the incident light includes an image from the optical system and focusing adjustment mechanism 9 and an image from the position indication image generation unit 8. On the photosensitive film 12, not only the image of the object image 3 but also the position data A are exposed to light.

Figure 3:
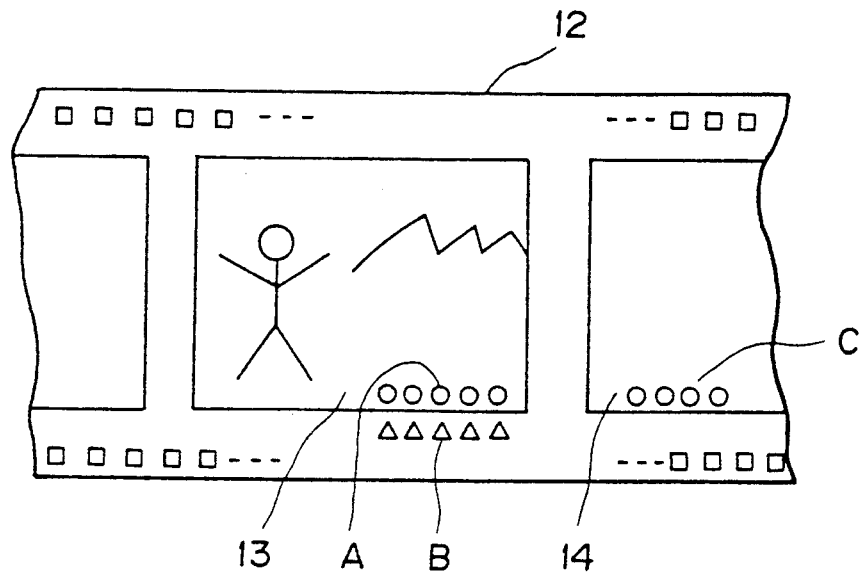
FIG. 3 is an explanatory view showing an exposure state to a photosensitive film.

The exposure state onto the photosensitive film 12 is shown in FIG. 3. As shown in FIG. 3, since ordinarily the still camera photographs the object image 3 every frame, the position data A is arranged, e.g., at the left and lower portion within the frame 13. Alternatively, in the case where there is a need of avoiding display of the position data A within the frame 13, there is employed an arrangement such that position data B is located outside the frame of the picture frame 13. In addition, there may be employed an arrangement such that position data C is located within the adjacent frame 14.

As stated above, position data A, position data B or position data C indicating the image pickup place is indicated along with the object image 3. Accordingly, in printing on a photographic paper, etc. after the photosensitive film 12 is developed, the object image 3 can be printed in combination with the map data of the position data A. An example of the print system of the map is shown in FIG. 4.

Figure 4:
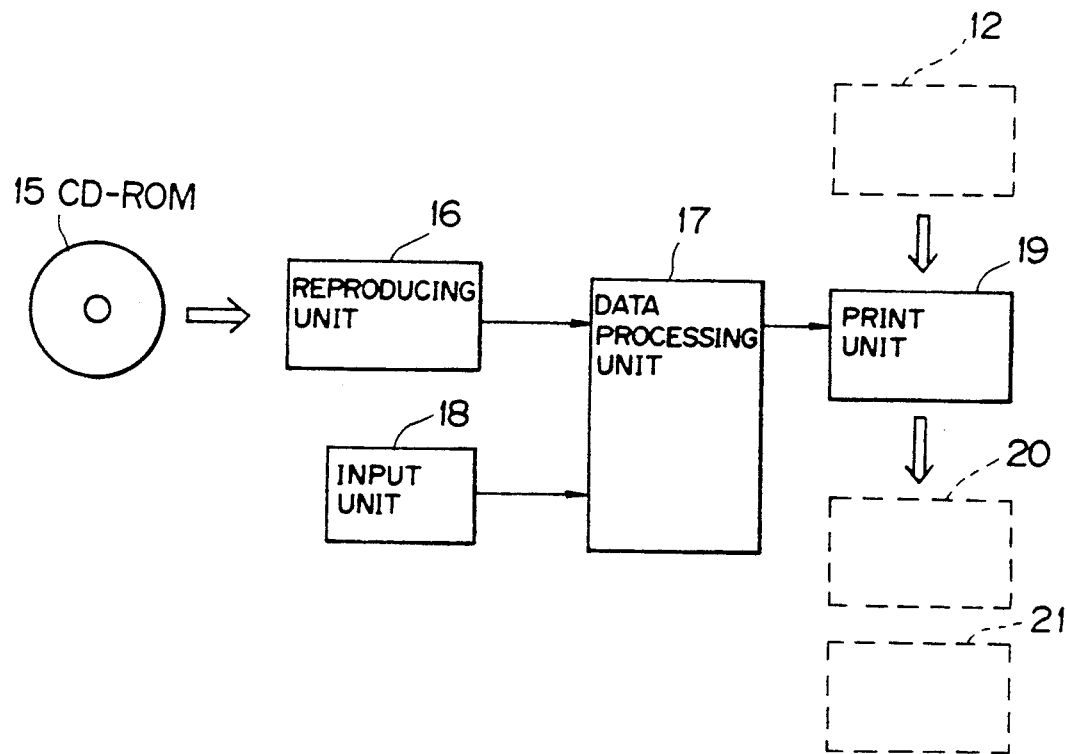
FIG. 4 is a block diagram showing an example of a print-out system.
Figure 5A:
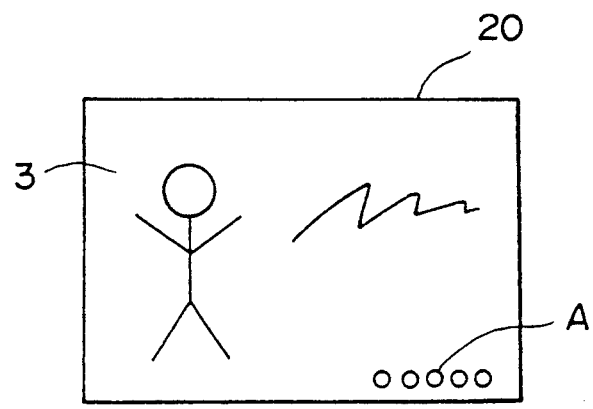
FIG. 5 is an explanatory view showing an example of a developed photograph wherein FIG. 5(*a*) is an explanatory view of an object photograph and FIG. 5(*b*) is an explanatory view of a map photograph.
Figure 5B:
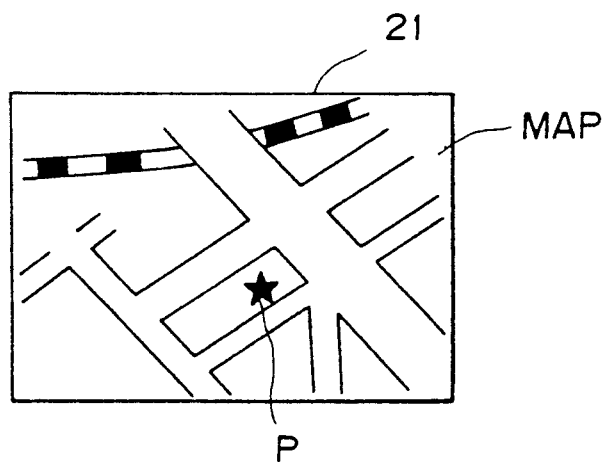

As shown in FIG. 4, a CD ROM 15 in which map data used in a navigation system, etc. is stored is subjected to reproducing processing by a reproducing unit 16, and the position data A indicated on the photosensitive film 12 is inputted to a data processing unit 17 by an input unit 18. The data processing unit 17 reproduces map data at a corresponding place on the basis of the position data A from the input unit 18 to deliver the map image signal to a print unit 19. The print unit 19 prints a negative image on the photosensitive film 12 onto a photographic paper, and prints a map image from the data processing unit 17 on a different photographic paper. As a result, an object photograph 20 is prepared as shown in FIG. 5(a), and a map photograph 21 of that image pickup place is prepared as shown in FIG. 5(b). According to need, the image pickup position mark P may be indicated as shown in FIG. 5(b). Data of the image pickup position mark P is subjected to write processing at the data processing unit 17.

As the mechanical or physical structure, although not shown, there may be employed, e.g., a structure in which the small GPS antenna 6, the GPS receiver 7, and the position indication image generation unit 8 are assembled in one body on the back side of the casing of the image pickup device body 4, or a structure including a fixed unit in the form of a shoulder case in which the GPS antenna 6, the GPS receiver 7 and the positioon indication image generation unit 8 are accommodated within a single case, and a detachable and movable unit including the image pickup device body 4 therein.

Figure 6:
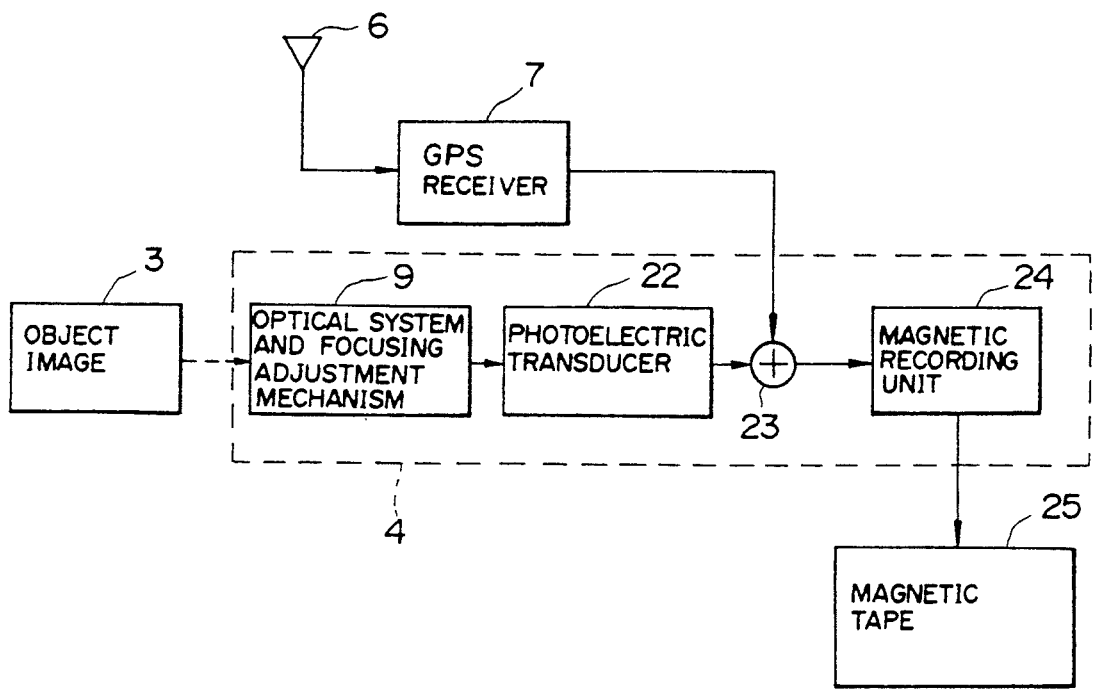
FIG. 6 is a block diagram of a second embodiment according to this invention.

A second embodiment is shown in FIG. 6. In the second embodiment, there is disclosed an example where this invention is applied to a video camera. Namely, a video camera is used as the image pickup device body 4.

As shown in FIG. 6, the image pickup device body 4 includes an optical system and focusing adjustment mechanism 9 for capturing a light of an object image 3, a photoelectric transducer 22 (e.g., CCD) for transforming that light to an electric signal, a coupler 23 for mixing the transformed signal with position data A from a GPS receiver 7, and a magnetic recording unit 24 (e.g., recording head) for recording the mixed image signal onto a magnetic tape 25. Since the GPS antenna 6 and the GPS receiver 7 are the same as those in the first embodiment, their explanation will be omitted.

In the above mentioned configuration, the object image 3 is taken into the image pickup device body 4 through the optical system and focusing adjustment mechanism 9. The object image thus taken thereinto is subjected to photoelectric conversion by the photoelectric transducer 22 and is delivered to the coupler 23. On the other hand, the GPS receiver 7 calculates present position data A to deliver it to the coupler 23. The coupler 23 prepares a mixed image of both images to deliver it to the magnetic recording unit 24. The magnetic recording unit 24 transforms the given electric signal to magnetism to record it on the magnetic tape 25.

As the method of indicating the above mentioned position data A, various methods are conceivable. For example, the following methods are enumerated. One method is to indicate position data A (numeric values of latitude and longitude) at each field of a video signal so that it is positioned at the right and lower portion, etc. on the picture. In this case, an image as shown in FIG. 5(a) is obtained from a visual point of view. Alternative method is to indicate a map picture (still picture) from the CD ROM continuously for a predetermined time every several fields.

As stated above, in accordance with this embodiment, also in the case where an image pickup device for a moving picture such as a video camera, etc. is employed, the photographic place can be automatically recorded.

Figure 7:
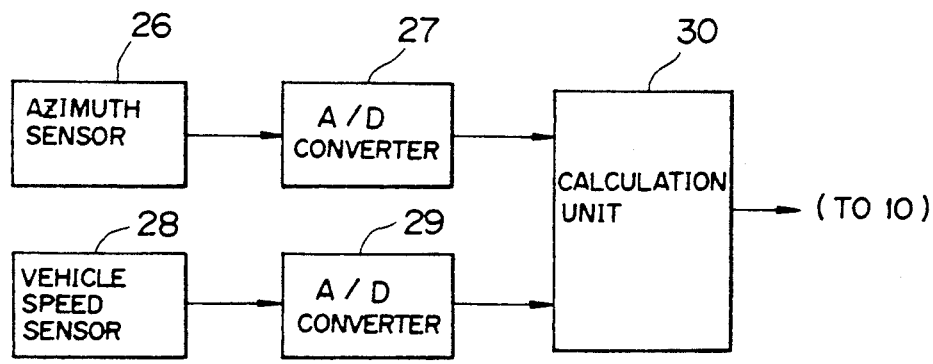
FIG. 7 is a block diagram showing the essential part of a third embodiment of this invention.

A third embodiment of this invention is shown in FIG. 7. In the third embodiment, there is disclosed an example where a so-called self-contained position sensor mounted in a vehicle to sense the running direction and the vehicle speed to thereby conduct positioning is used in place of the GPS receiver 7 as the position detection means 1.

As shown in FIG. 7, the self-contained sensor comprises an azimuth sensor 26 such as a magnetic vector sensor or a gas rate gyroscope having helium gas, etc., a vehicle speed sensor 28 for sensing the number of rotations of the vehicle axle or the crank shaft by combination of a photo coupler and a shutter plate, A/D converters 27 and 29 for carrying out A/D conversion of output signals from the azimuth sensor 26 and the vehicle speed sensor 28, respectively, and a calculation unit 30 for calculating and outputting position data A on the basis of the azimuth signal and the speed signal which have been subjected to A/D conversion. The position data A from the calculation unit 30 is delivered to the coupler 10. Other components are the same as those in FIG. 2 or 6.

In accordance with the third embodiment, a navigation system of a simple structure can be realized without using the GPS receiver 7.

What is claimed is:

1. An image pickup device comprising:
   a still picture image pickup device body for photographically recording an object image onto a photosensitive film,
   position detection means for detecting a present location of said image pickup device body at the same time when the object image is recorded,
   recording means for recording, onto said photosensitive film, data indicative of the present location obtained by said position detecting means,
   data storage means for storing map data, and
   data processing means for producing present location map data indicative of the present location from the map data stored in said data storage means and the data indicative of the present location.

2. An image pickup device according to claim 1, wherein said position detection means comprises a GPS receiver.

3. An image pickup device according to claim 1, further comprising print means for printing photographs of the object image and map data of the present location.

4. An image pickup device according to claim 1, further comprising an input unit for inputting the present location data to said data processing means.

5. An image pickup device according to claim 1, wherein said data storage means comprises a compact disk read-only-memory (CD-ROM).

* * * * *